US008754884B2

(12) United States Patent
Karlsson (10) Patent No.: US 8,754,884 B2
(45) Date of Patent: Jun. 17, 2014

(54) 3D VIRTUAL ENVIRONMENT FOR GENERATING VARIABLE DATA IMAGES

(75) Inventor: Jonas Karlsson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 793 days.

(21) Appl. No.: 12/563,516

(22) Filed: Sep. 21, 2009

(65) Prior Publication Data

US 2011/0069071 A1 Mar. 24, 2011

(51) Int. Cl.
*G06T 15/00* (2011.01)

(52) U.S. Cl.
USPC .......................................... 345/419

(58) Field of Classification Search
CPC ......... G06T 19/00; G06T 15/00; G06T 17/00; G06T 15/20; G06T 19/20; G06T 19/003; G06T 2200/04; G06T 2200/16; G06T 2219/2004; G06T 2210/61; G06T 2210/04; G06T 2219/024; G06T 2207/20104
See application file for complete search history.

(56) References Cited

U.S. PATENT DOCUMENTS

| | | | | |
|---|---|---|---|---|
| 5,886,703 A * | 3/1999 | Mauldin | ....................... | 345/423 |
| 6,690,393 B2 * | 2/2004 | Heron et al. | .................. | 715/757 |
| 2002/0149604 A1 * | 10/2002 | Wilkinson | ..................... | 345/643 |
| 2003/0179201 A1 * | 9/2003 | Thacker | ........................ | 345/441 |
| 2003/0214515 A1 * | 11/2003 | Bhattacharyay et al. | ...... | 345/629 |
| 2004/0119689 A1 * | 6/2004 | Pettersson | ..................... | 345/157 |
| 2004/0189633 A1 * | 9/2004 | Sederberg | ..................... | 345/418 |
| 2005/0030267 A1 * | 2/2005 | Tanghe et al. | .................... | 345/82 |
| 2009/0021513 A1 * | 1/2009 | Joshi et al. | .................... | 345/419 |
| 2009/0091571 A1 * | 4/2009 | Zalewski | ....................... | 345/427 |
| 2009/0172561 A1 * | 7/2009 | Driemeyer et al. | ........... | 715/744 |
| 2011/0018870 A1 * | 1/2011 | Shuster | ......................... | 345/419 |

OTHER PUBLICATIONS

Toshitada et al. The Interactive Virtual Space Presentation System Considering Users Background; Proceedings of the International Conference on Advanced Information Networking and Applications (AINA'05); IEEE 2005.*
Chittaro et al. Dynamic Generation of Personalized VRML Content: a General Approach and its Application to 3D E-Commerce; Web3D'02; ACM, Feb. 2002.*
EPIC; Privacy and Consumer Profiling; http://web.archive.org/web/20080103021317/http://epic.org/privacy/profiling/; dated Oct. 13, 2004; retrieved by the Internet Archive Jan. 3, 2008.*
Xerox, FreeFlow Performance Accelerated., FreeFlow Overview, 8 pages (2005).
Xerox, "VIPP Pro Publisher Simplicity and power in one package," FreeFlow, 2 pages (2008).

(Continued)

*Primary Examiner* — Carlos Perromat
(74) *Attorney, Agent, or Firm* — Hoffmann & Baron, LLP (57) ABSTRACT

Embodiments described herein are directed to generating a variable data image using a variable data image generator. The variable data image generator assigns a variable identifier to a specified location in a 3D scene to identify the specified location as being variable and populate the 3D scene with a component at the specified location based on the variable identifier and in response to a predefined populating rule. The predefined populating rule is applied based on an attribute of a recipient for which a static image of the 3D scene is to be generated. The component is selected and inserted at the specified location in accordance with the populating rule and with a perspective substantially matching a perspective of the specified location. The variable data generator outputs the static image of the 3D scene for the recipient, wherein the static image includes the component.

22 Claims, 7 Drawing Sheets

(56) References Cited

OTHER PUBLICATIONS

Google 3-D Warehouse—Overview, http://www.google.com/intl/en/sketchup/3dwh/, 1 page (2009).
Google 3-D for Everyone, http://sketchup.google.com/intl/en/product/gsu.html, 2 pages (2009).
"What is Second Life?", http://secondlife.com/whatis/, 2 pages (2009).
Tutorial: Project Wonderland World Builder, http://wiki.java.net/bin/view/Javadesktop/ProjectWonderlandWorldBuilder, 8 pages (Aug. 6, 2008).
How does 3D Export Work?, http://www.3dexport.com/, 2 pages, Mar. 3, 2010.
Variable Data Printing (VDP), http://www.xmpie.com/vdp, 3 pages, Mar. 3, 2010.

* cited by examiner

3D VIRTUAL ENVIRONMENT FOR GENERATING VARIABLE DATA IMAGES

BACKGROUND

1. Technical Field

The presently disclosed embodiments are directed to generating static images using 3D scenes that include variable data locations.

2. Brief Discussion of Related Art

Variable data images typically provide value by customizing an image with information specific to an intended recipient. For example, an image of a beach can have the recipient's name written in the sand, or a product can be displayed in an environment resembling the recipient's home location. Images are typical defined without data parameters for defining depth even though the images may produce the effect of depth. As a result, attempting to insert text into the images to achieve a desired effect and perspective can be difficult because the text typically needs to be scaled, rotated, or otherwise deformed depending on the location at which the text will be inserted.

Conventionally, in order to insert variable content into a variable data image, a user must perform transformations on the custom image information to define appropriate scaling, rotation, and other deformations needed to achieve the proper effect and perspective. These transformations are typically specified manually, or using image analysis, adding cost to the design process. The process of generating variable data images in this manner can also be burdensome and time consuming for users.

SUMMARY

According to aspects illustrated herein, there is provided a method for generating a variable data image using a computing system having one or more computing devices configured to implement a variable data image generator. The method includes assigning a variable identifier to a specified location in a 3D scene to identify the specified location as being variable and populating the 3D scene with at least one component at the specified location based on the variable identifier and in response to at least one predefined populating rule implemented using the variable data image generator. The at least one predefined populating rule is applied based on at least one attribute of a recipient for which a static image of the 3D scene is to be generated. The component is selected and inserted at the specified location in accordance with the at least one populating rule. The method further includes generating the static image of the 3D scene for the recipient. The static image includes the at least one component.

According to other aspects illustrated herein, there is provided a computer readable medium storing instructions executable by a computing system including at least one computing device, wherein execution of the instructions implements a method for generating a variable data image. The execution of the instructions implements a method that includes assigning a variable identifier to a specified location in a 3D scene to identify the specified location as being variable and populating the 3D scene with at least one component at the specified location based on the variable identifier and in response to at least one predefined populating rule implemented using the variable data image generator. The at least one predefined populating rule is applied based on at least one attribute of a recipient for which a static image of the 3D scene is to be generated. The component being selected and inserted at the specified location in accordance with the at least one populating rule. The execution of the instructions implements a method that also includes generating the static image of the 3D scene for the recipient. The static image includes the at least one component.

According to further aspects illustrated herein, there is provided a system for generating a variable data image. The system includes a computing system having one or more computing devices. The computing system is configured to assign a variable identifier to a specified location in a 3D scene to identify the specified location as being variable and populate the 3D scene with at least one component at the specified location based on the variable identifier and in response to at least one predefined populating rule implemented using the variable data image generator. The at least one predefined populating rule is applied based on at least one attribute of a recipient for which a static image of the 3D scene is to be generated. The component is selected and inserted at the specified location in accordance with the at least one populating rule. The computing system is further configured to generate the static image of the 3D scene for the recipient, wherein the static image includes the at least one component.

DETAILED DESCRIPTION

Exemplary embodiments include a variable data image generator for generating three-dimensional (3D) scenes including variable data, which can be populated according to attributes of identified recipients. Embodiments of the variable data image generator can insert various components into the 3D scenes based on populating rules that are applied to recipient attributes and can identify a virtual camera position and orientation from which a screenshot can be captured. The 3D scenes can be converted to static images targeting recipients, and the static images can be output for distribution to the recipients.

As used herein, a "3D modeling unit" refers to a tool for implementing 3D scenes in a 3D area. The 3D area allows users generate a 3D scene that can be viewed from different points of view to change a perspective and orientation of the 3D scene with respect to the user viewing the 3D scene. A "3D modeling area" is a simulated environment providing a virtual area in which 3D scenes can be generated. Some examples of a 3D area include computer aided design tools, such as AutoCAD from Autodesk, Inc., SolidWorks from Dassault Systèmes SolidWorks Corp., TopSolid from Missler Software Corp., Cinema 4D from Maxon Computer GmbH, Google SketchUp from Google Inc., and so on, and virtual worlds, such as Second Life from Linden Research, Inc.

(Linden Labs®), Project Wonderland from Sun Microsystems, Inc., Qwaq Forums from Qwaq, Inc., and the like.

As used herein, a "3D scene" refers to a virtual space generated in a 3D modeling area, which is rotatable and defined in three-dimensions to permit a user to view the 3D scene from different points of view.

As used herein, "variable" refers to something that is subject to change, a "variable data image" refers to an image in which variable locations have been populated with components, and a "variable identifier" refers to a marker used to identify a variable in a 3D scene.

A "variable data image generator" is a tool for generating variable data images from a 3D scene having locations identified as being variable.

As used herein, "populating" refers to inserting a component into a 3D scene and a "populating rule" refers to a defined procedure for determining which components to use when populating a 3D scene.

As used herein, a "component" refers to an item that can be inserted into a 3D scene including, for example, a textural component, a 3D model component, a textual component, and the like. A "textural component" is a component that imparts texture to a surface or thing in the 3D scene, where texture refers to visual characteristics that create a distinctive appearance. Some examples of a textural component include a brick wall, grass, sand, dirt, and the like, that is implemented virtually in a 3D scene. A "3D model component" is defined using three-dimensions such that the 3D model component can be viewed from different points of view to reveal different aspects and features of the 3D model component. Some examples of a 3D model component can include, for example, a virtual model of a car, boat, a person, a house, a machine or device, and so on. A "textual component" is a component that formed from text.

As used herein, an "attribute" refers to a characteristic, trait, demographic, feature, or quality that can be associated with a person, place, thing, component, and the like.

As used herein, a "recipient" refers to a person or group of people for which a variable data image is generated and to which a variable data image can be distributed.

As used herein, "static" refers to constant and unchanging and a "static image" refers to an image that is defined from a single point of view having a fixed perspective and orientation. A static image can be defined in two-dimensions with three-dimensional perspective, but is undefined from other points of view because the static image does not have a defined third dimension that allows the content of the image to be viewed from different points of view.

As used herein, "perspective" refers to a spatial relationship of components in a scene or image to each other and to the scene or image as a whole to represent three-dimensions and depth relationships.

As used herein, "orientation" refers to a relationship between a location or position and components of a 3D scene. An orientation can be based on a coordinate system of the 3D scene such that the orientation can be relative to an origin of the coordinate system or other coordinates of the coordinate system.

As used herein, a "surface" refers to a bounded area having a surface area, such as, for example, a wall in a 3D scene.

As used herein, a "point" refers to a location in a 3D scene that can be identified by a single x, y, and z coordinate or a group of x, y, and z coordinates which are close together.

As used herein, "virtual camera" refers to a tool for capturing a screenshot of a 3D scene from a specific point of view to generate a static image of the 3D scene having a fixed perspective and orientation. A screenshot refers to a process of copying a 3D scene as it is, or would be, displayed on a display device.

As used herein, a "point of view" refers to a position from which a 3D scene can be observed.

As used herein, "capturing" refer to storing information in computer memory. Information captured can be stored in one or more computer file formats.

As used herein, "specify" refers to defining particulars or specifications, where a "specified location" is particular area, region, surface, point, and so on, in a 3D scene.

Figure 1:
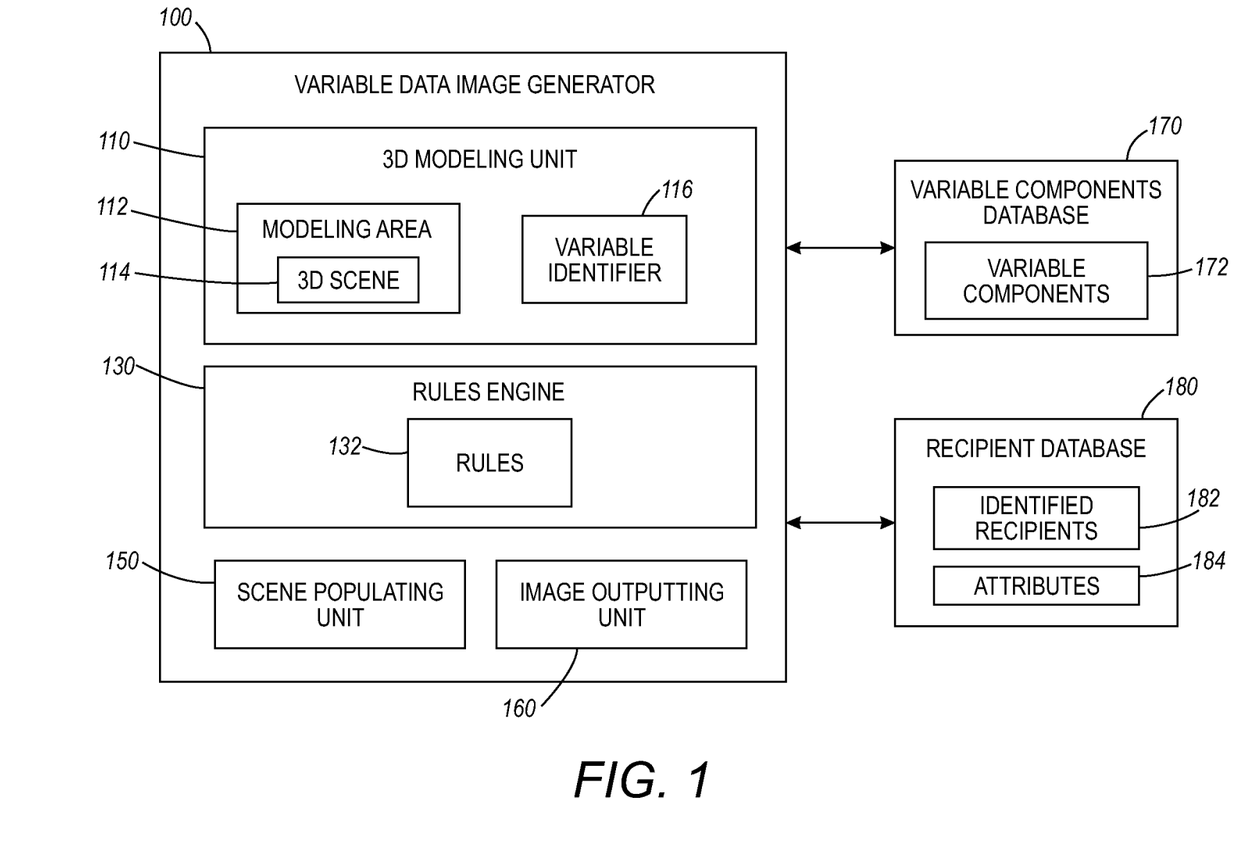
FIG. 1 is a block diagram illustrating a variable data image generator.

FIG. 1 depicts a block diagram of a variable data image generator 100 (hereinafter "generator 100") that includes a 3D modeling unit 110, a rules engine 130, a scene populating unit 150 (hereinafter "populating unit 150"), and an image outputting unit 160. The generator 100 can interface with a variable component database 170 and a recipient database 180. In some embodiments, the databases 170 and 180 can be integrated with the generator 100. The generator 100 provides a three-dimensional (3D) virtual environment in which a 3D scene can be generated to include locations identified as being variable. Variable components, such as text, graphical components (e.g., 3D modeling of components, such as cars, balloons, signs, buildings, textures, etc.), and the like can be inserted into the 3D scene at the locations identified as being variable based on the rules applied to attributes of the recipients. The generator 100 uses one or more virtual camera positions and orientations from which a screenshot can be captured to create one or more static images of the scene for each identified recipient. Depending on attributes associated with the recipient, different components can be inserted into the scene by the generator 100. For example, different text can be displayed on a surface identified as being variable, different components can be placed at a point in the scene that is identified as being variable, and/or different camera positions and orientations can be used within the virtual environment to generate the final static image for each identified recipient based on attributes associated with the recipients. The proper perspective and lighting is automatically created by the generator 100 so there is no need to specify or compute any image transformation.

The 3D modeling unit 110 includes a modeling area 112 and a variable identifier 116. The modeling area 112 provides a 3D modeling environment for development of a 3D scene 114. The modeling area 112 can provide a graphical user interface (GUI) that allows a user to create the 3D scene 114 being defined in three-dimensions using a 3D coordinate system having an x-axis, a y-axis, and a z-axis such that points in the 3D scene can include x, y, and z coordinates. The modeling area 112 allows a user to rotate the 3D scene 114 to view the 3D scene 114 from different points of view so that, for example, an component in the 3D scene 114 can be viewed from different sides and at different angles while providing the appropriate scale, perspective, and orientation of the component in the 3D scene 114. The 3D scene 114 can include terrain, surfaces (with or without texture), 3D models, text, and the like. The point of view of the 3D scene 114 can be changed by adjusting the camera position and orientation so that components of the 3D scene 114 can be viewed from any locations within the 3D scene. Virtual lighting sources can be implemented in the 3D modeling area 112 to illuminate regions of the 3D scene 114 and cast shadows in other regions of the 3D scene 114. The location and orientation of the virtual light sources can be changed to vary the lighting effects in the 3D scene 114.

The user can specify locations in the 3D scene as being variable using variable identifiers 116. The variable identifiers 116 can, for example, associate identifiers with coordinates in the 3D scene 114 at which components can be dynamically inserted in response to an application of rules conditioned upon attributes of identified recipients. For example, the user can select or otherwise specify coordinates, such as a set of x, y, and, z coordinates that define a surface in the 3D scene 114 and can associate the variable identifiers 116 with the coordinates. The variable identifiers 116 can include, for example, a string of characters and/or can be a graphical component inserted in the 3D scene at the coordinates to identify the locations as being variable. The variable identifiers 116 can be associated with a set of rules to be applied by the rules engine 130 and can be associated with a set of components that can be inserted at the locations associated with the variable identifiers 116.

The variable component database 170 can include components 172 for insertion into the 3D scene at locations that have been specified as being variable using the variable identifier 116. The components 172 can be 3D models of textured surfaces, terrain, components, text, and the like. Sets of components 172 in the database 170 can be associated with the variable identifiers 116 used to indicate that locations are variable. For example, when the user specifies that a surface in the 3D scene is variable by associating a variable identifier with a surface, a set of texture components can be associated with the variable identifier so that any one of the texture components from the set can be inserted into the 3D scene to cover the surface.

A recipient database 180 can identify recipients 182 and attributes 184 of the recipients 182. The database 180 can include a list of the recipients 182 and can associate some, all, or none of the attributes 184 with the recipients 182. The recipients 182 can be those individuals or entities for which a custom variable data image can be generated and to whom the custom variable image can be distributed. The attributes 184 can include gender, age, educational level, consumer interests, occupation, income, hobbies, marital status, ethnicity, religious affiliation, political affiliation, information generated from marketing research, and the like. The attributes 184 can be used by the rules engine 130 when determining which of the components 172 from the variable component database 170 should be inserted into the 3D scene as well as at what camera position and camera orientation (point of view) a screenshot should be taken to generate a static image for the recipients 182.

The rules engine 130 includes populating rules 132 (hereinafter "rules 132") for determining which components 117 should be used to populate the locations in the 3D scene 114 that have been identified as being variable. The rules 132 can include conditional logic for making the determinations based on recipient information 134 to facilitate targeted image generation for identified recipients. As one exemplary implementation, the rules engine 130 can identify a particular component for insertion into the 3D scene if the recipient is between the ages of 18-25 years old and can identify another particular component if the recipient is between the ages of 26-35 years old.

The identifiers used to specify locations in the 3D scene 114 as being variable can be associated with different sets of rules. For example, a first identifier can be associated with a first set of rules directed to the gender of the recipient and a second identifier can be associated with a second set of rules directed to an age of the recipient. The rules 132 can be compound conditions such that for example logic conditions for multiple attributes are performed depending on the level of targeting specificity desired during the image creation. For example, the rules 132 can identify a particular component to be inserted into the 3D scene based on whether the recipient is a female and is between the ages of 35-45 years old.

The populating unit 150 inserts components identified by the rules engine into the 3D scene at the locations that of been identified as being variable using the variable identifiers 116. The populating unit 150 inserts the components into the 3D scene 114 at the locations and the modeling unit 110 automatically modifies the components so that a scale, perspective, and orientation of the components are appropriate for the locations at which the components are inserted and for the points of view from which the components can be viewed. The modeling unit 110 can modify the components appearance to conform to the perspective of the location by accounting for the 3D coordinates of the location. As one example, an component can be a brick wall to be cover a surface in the 3D scene 114 that has been identified as being a variable surface. The populating unit 150 can insert the brick wall into the modeling area 112 and the modeling unit 110 can conform the brick wall to the surface so that the brick wall has the same perspective and orientation of the surface. As another example, an component can be a 3D model of a car can be inserted into the 3D scene and the modeling unit 110 can modify the size of the 3D model of the car to ensure that the 3D model has the appropriate perspective for the location at which it is inserted. The modeling area can also rotate the 3D model of the car so that the 3D model has the appropriate orientation in the 3D scene.

The image outputting unit 160 captures the 3D scene based on the rules 132 implemented by the rules engine 130. The rules engine 130 can identify camera positions and orientations (e.g., a point of view of the scene from the perspective of an observer) and the image outputting unit 160 can generate static images from the 3D scene 114 by capturing a screenshot of the 3D scene from the camera position and orientation identified by the rules engine 130. The static images can include the components inserted by the populating unit 150 and can be output for distribution to the recipients for whom the images were generated. The static images can be distributed as print media, electronic mail (e-mail) messages, image files, and the like.

Figure 2:
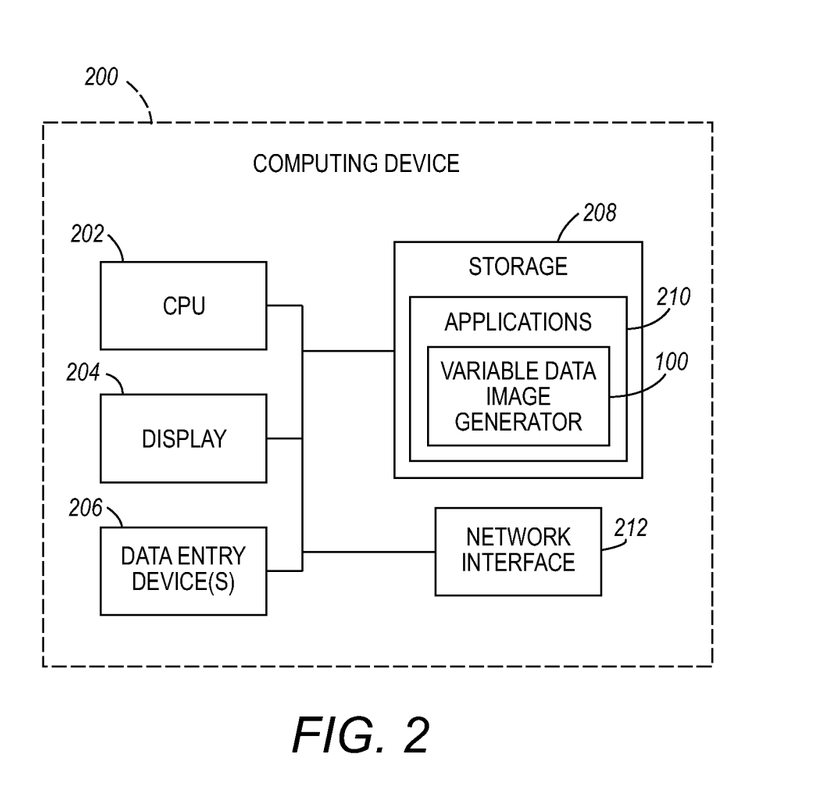
FIG. 2 is an exemplary computing device configured to implement embodiments of a variable data image generator.

FIG. 2 depicts an exemplary computing device 200 for generating variable data images to facilitate personalized static images based on the intended recipients using the generator 100. The computing device 200 can be a mainframe, personal computer (PC), laptop computer, workstation, handheld device, such as a PDA, or the like. In the illustrated embodiment, the computing device 200 includes a central processing unit (CPU) 202 and can include a display device 204. The display device 204 enables the computing device 200 to communicate with an operator through a visual display. The computing device 200 can further include data entry device(s) 206, such as a keyboard, touch screen, and/or mouse. The computing device 200 can include storage 208 for storing data and instructions, such as 3D scenes, variable identifiers, variable components, rules implemented using the rules engine, recipient information, populated scenes, generated images using the scenes, applications, and the like. The storage 208 can include such technologies as a floppy drive, hard drive, tape drive, Flash drive, optical drive, read only memory (ROM), random access memory (RAM), and the like.

Applications 210, such as the generator 100, or components thereof, can be resident in the storage 208. The applications 210 can include instructions for implementing the variable data image generator 100. The storage 208 can be local or remote to the computing device 200. The computing device 200 includes a network interface 212 for communicating with a network. The CPU 202 operates to run the applications 210 in storage 208 by performing instructions therein and storing data resulting from the performed instructions, which may be presented to a user via the display 204 or by other mechanisms known to those skilled in the art, such as a print out from a printer. The data can include the 3D scenes, variable identifiers, variable components, rules implemented using the rules engine, recipient information, populated scenes, generated images using the scenes, and the like.

Figure 3:
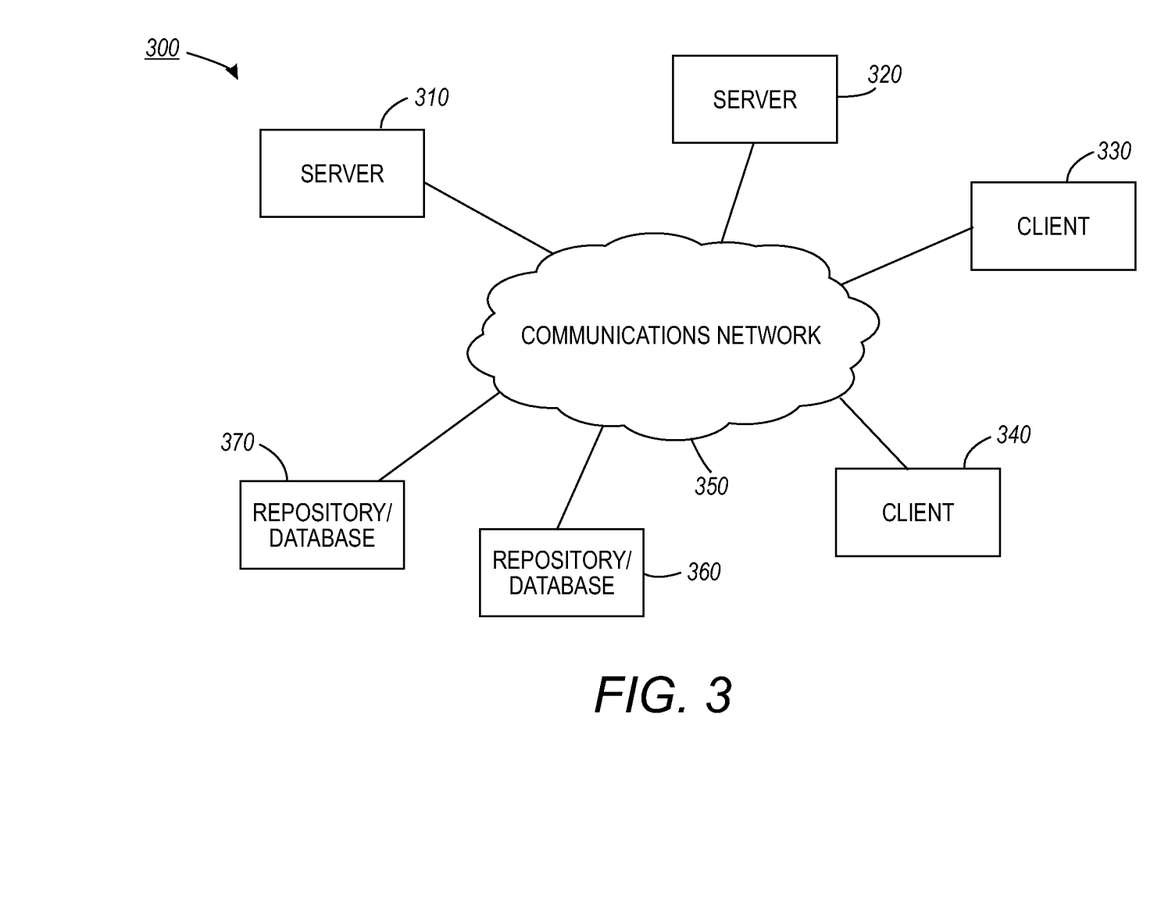
FIG. 3 is an exemplary distributed system for implementing embodiments of a variable data image generator.

FIG. 3 depicts an exemplary distributed system 300 for implementing embodiments of the generator 100. The distributed system 300 includes one or more servers 310 and 320 coupled to clients 330 and 340, via a communication network 350, which can be any network over which information can be transmitted between devices communicatively coupled to the network. The system 300 can also include repositories or database devices 360 and 370, which can be coupled to the servers 310/320 and clients 330/340 via the communications network 350. The servers 310/320, clients 330/340, and database devices 360/370 can be implemented using a computing device, such as a computing device implemented in a similar manner as the computing device 200 of FIG. 2. In some embodiments, the generator 100 can be implemented using a single computing device or can be implemented using multiple computing devices in a distributed manner.

The servers 310/320, clients 330/340, and/or databases 360 can store information, such as 3D scenes, variable identifiers, variable components, rules implemented using the rules engine, recipient information, populated scenes, generated images using the scenes, and the like. In some embodiments, the generator 100 can be distributed among the servers 310/320, clients 330/340, and database devices 360 such that one or more components of the variable data image generator 100 and/or portion of one or more components of the variable data image generator 100 can be implemented by a different device (e.g. clients, servers, databases) in the communication network 350. For example, the 3D modeling unit 110 can be resident on the server 310 and/or the client 330, the rules engine 130 can be resident on the server 320, the scene populating unit 150 and image outputting unit 160 can be resident on the client 330, the variable component database 170 can be implemented using the database device 360 and the recipient database 180 can be implemented using the database device 370.

Figure 4:
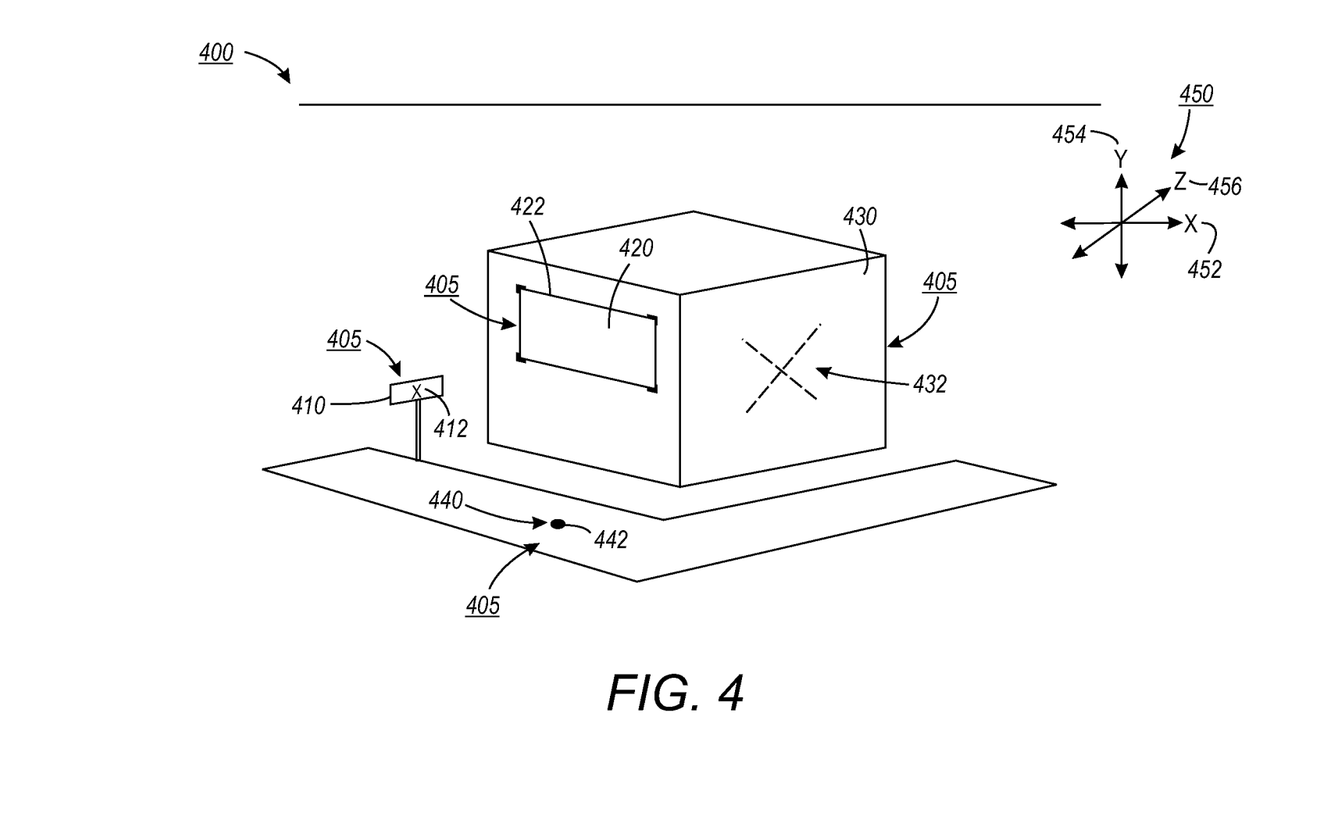
FIG. 4 is an exemplary three-dimensional (3D) scene that can be generated using a variable data image generator.

FIG. 4 is an exemplary 3D scene 400 that can be generated using the generator 100. The scene 400 can include locations 405 identified as being variable using variable identifiers. For example, a surface 410 can be identified as being variable using a variable identifier 412, a surface 420 can be identified as being variable using a variable identifier 422, a surface 430 can be identified as being variable using a variable identifier 432, and a point 440 can be identified as being variable using a variable identifier 442. The variable identifiers 412, 422, and 432 can be associated with sets of variable components that can be used to populate the 3D scene 400 base on an application of rules to the attributes associated with the recipients. For example, variable identifiers 412 and 422 can be associated textual components stored in the variable component database, the variable identifier 432 can be associated with textural components stored in the variable component database, and variable identifier 442 can be associated with 3D model image components stored in the variable component database.

The scene 400 can be associated with a coordinate system, such as an XYZ coordinate system 450 having an x-axis 452, a y-axis 454, and a z-axis 456 such that the components of the scene 400 can be referenced using a set of x, y, and z coordinates. The scene 400 can be viewed from different directions or locations within the 3D modeling area to change the point of view from which the scene 400 is being viewed. In this manner, every viewable location can be defined to allow a user to implement different camera positions and orientations from which screenshots can be captured.

Figure 5:
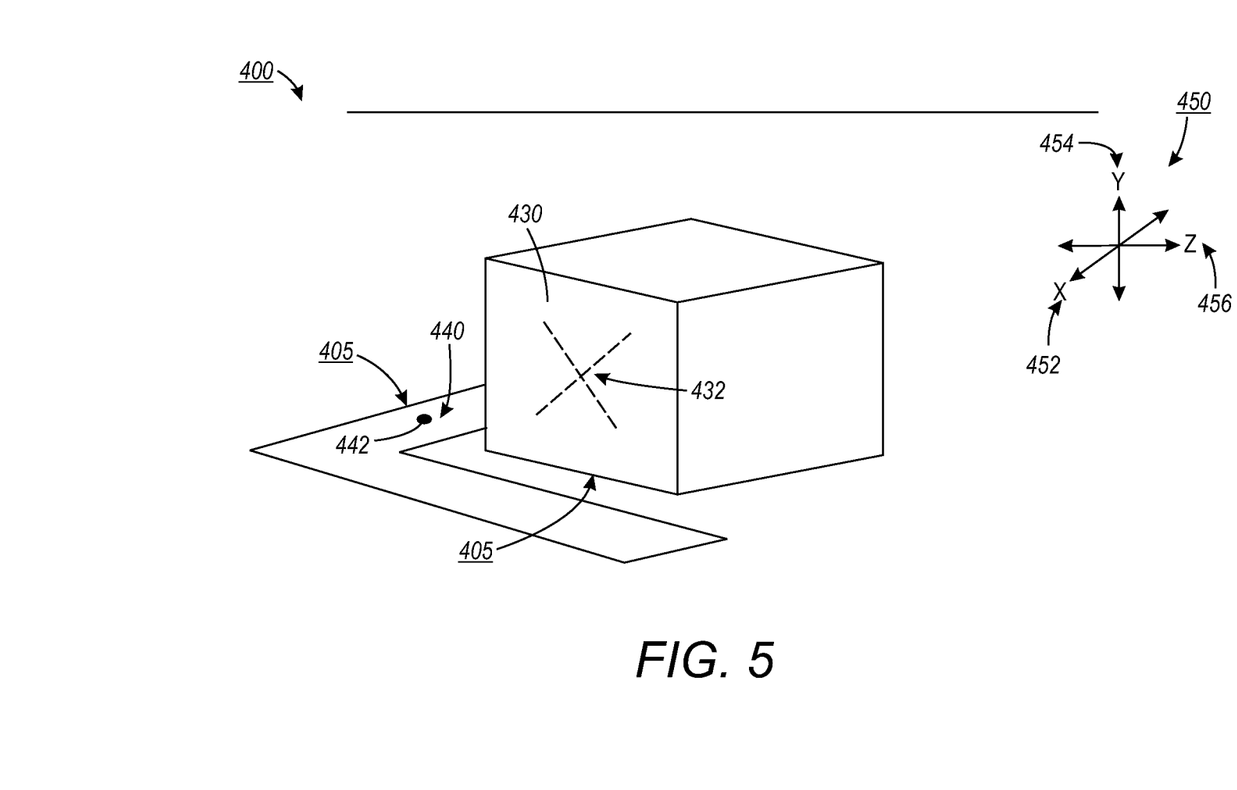
FIG. 5 shows the 3D scene of FIG. 4 from another point of view.

For example, FIG. 5 illustrates another point of view that can be implemented within the scene 400. In the present example, the scene has been rotated 90 degrees about its y-axis 454 so that the position of the x-axis 452 and z-axis 456 have changed with respect to the point of view of the scene 400, but the y-axis 454 remains unchanged. The 3D scene allows a user to generate different images from a single 3D scene by changing the variable data locations, changing the camera positions in the 3D scene, and capturing images using at the different camera positions and orientations.

Figure 6:
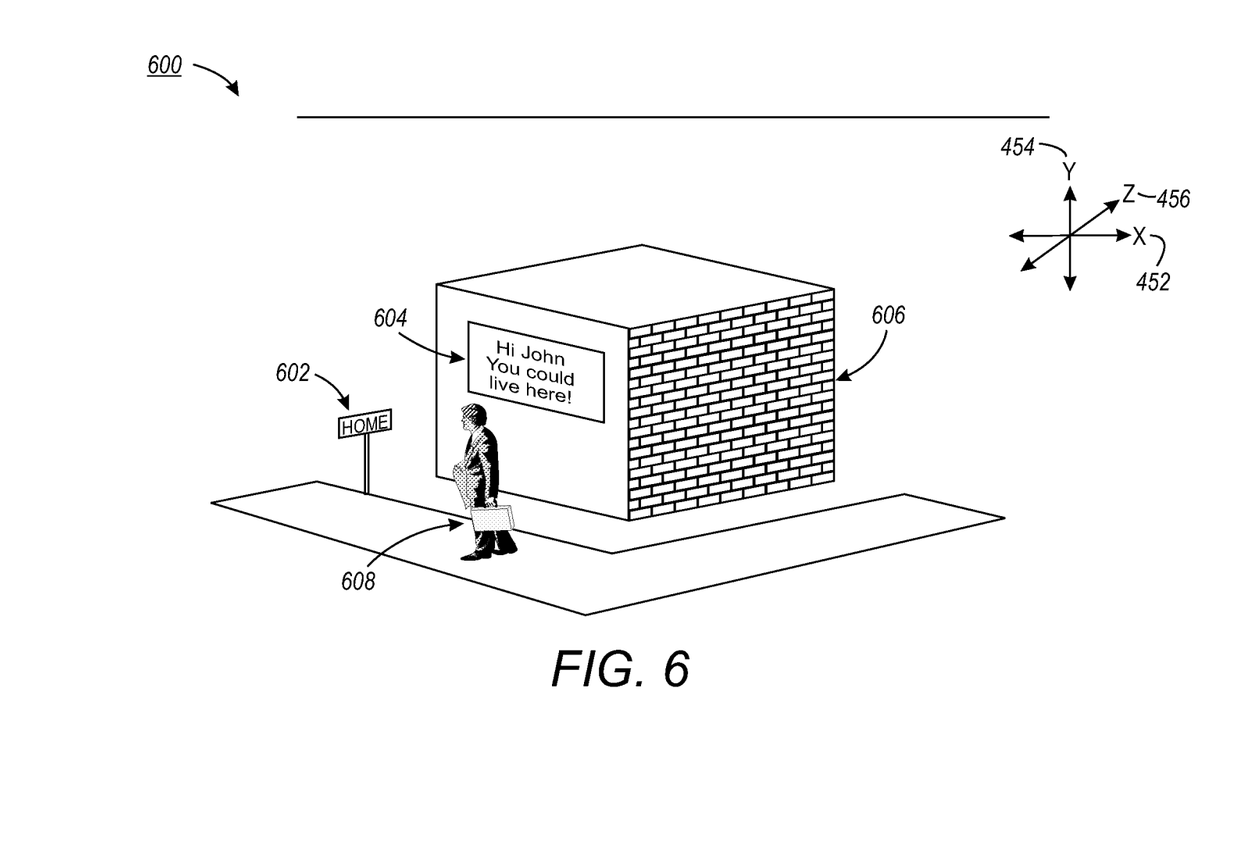
FIG. 6 is the exemplary 3D scene of FIG. 4 with variable components inserted therein.

FIG. 6 is a populated 3D scene 600 corresponding to the 3D scene 400 of FIG. 4 after the 3D scene 400 has been populated with variable components at the variable data locations identified by the variable identifiers. In the present example, the recipient can be a male having the name "John", which can be representative of attributes of the recipient that can be used by the generator when generating a customized image using the 3D scene 400. While the present example illustrates a simply application of the generator, those skilled in the art will recognize that more complex applications can be implemented using additional attributes and rules.

The populated scene 600 includes textual components 602 and 604 inserted at the variable locations 410 and 420 corresponding to the variable identifiers 412 and 422, respectively. The variable location 410 can be sign post, which is populated with the textual component 602, "Home", where the text component 602 has been automatically scaled and positioned to fit on the sign post with the correct perspective and orientation so that regardless of the camera position and view perspective the textual component 602, "Home", has the appropriate perspective and orientation for each of the defined points of view. Likewise, the variable location 420 can be a sign on a wall of a structure, which is populated with a message in the form of the textual component 604, which reads "Hi John, You could live here!" The textual component 604 includes a personalization directed to the intended recipient of the image to be generated from the populated 3D scene 600. The personalization of the message can be performed by the generator using the rules as applied to the recipient attributes. As in the present example, the generator inserts the recipient's name, John, into the textual component 604 based on an application of the rules. The textual component 604 has been automatically scaled and positioned to fit on the sign with the correct perspective and orientation so that regardless of the camera position and orientation the textual component 604, "Hi John, You could live here!", has the appropriate perspective and orientation for each of the defined points of view.

The populated scene 600 includes a textural component 606 inserted at the variable locations 430 corresponding to the variable identifiers 432 and a 3D model image component 608 inserted at the variable location 440 corresponding to the variable identifiers 442. The variable location 430 can be a wall of the structure, which is populated with the textural component 606, which in the present example is a brick wall. The textural component 606 has been automatically scaled and positioned to fit on the wall with the correct perspective and orientation so that regardless of the camera position and orientation the textural component 606 has the appropriate perspective and orientation for each of the defined points of view. The variable location 440 can be a point in the 3D scene, which is populated with the 3D model image component 608, which in the present example is an image of a male adult. The image component 608 has been automatically scaled and positioned to fit in the 3D scene with the correct perspective and orientation so that regardless of the camera position and orientation the image component 608 has the appropriate perspective and orientation for each of the defined points of view.

Once the 3D scene is populated and the camera position and orientation is specified in response to an application of the rules on the recipient attributes, the generator can capture the 3D scene as a screenshot to generate a image for distribution to the recipient. The generated image is static and lacks the 3D properties in that the image only includes a single point of view and does not define different perspectives and orientation so that the image cannot be used to implement different camera positions and orientations from which other images can be captured.

Figure 7:
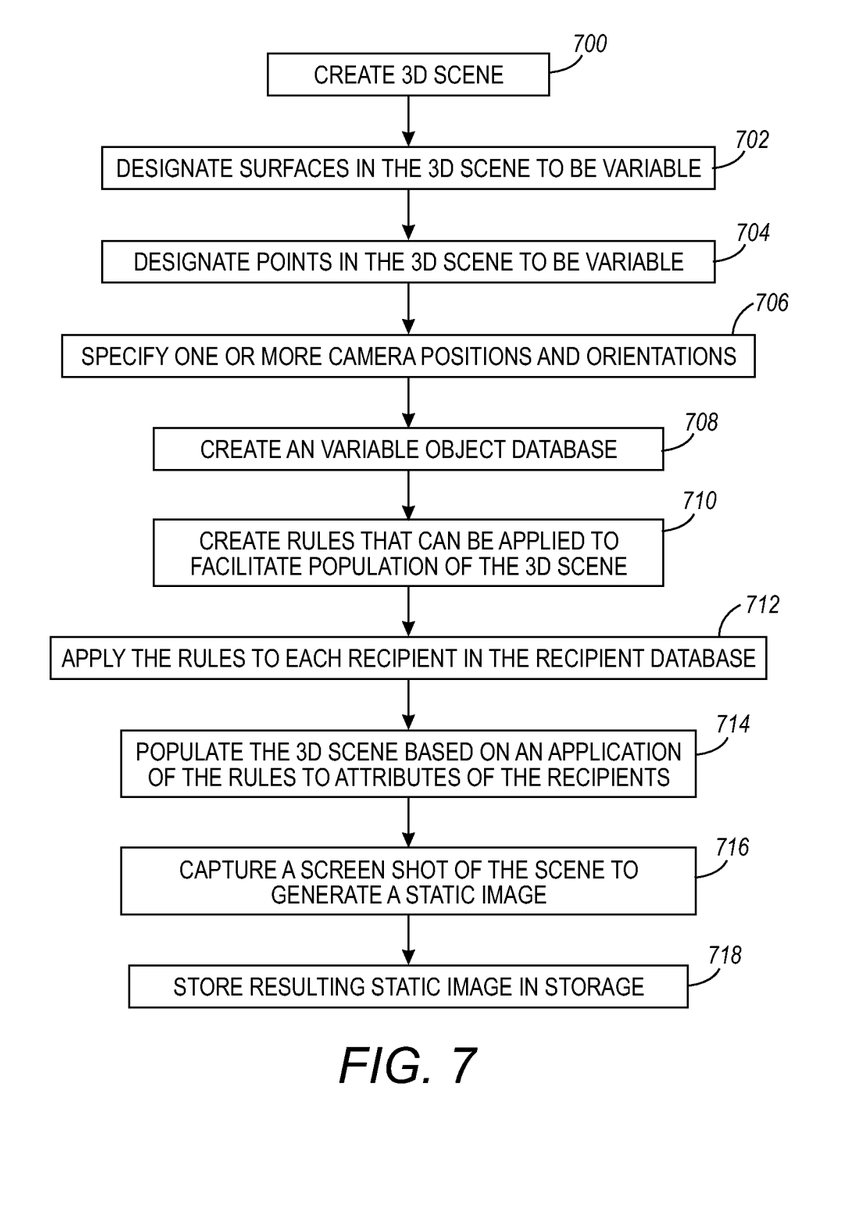
FIG. 7 is a flowchart of an exemplary process for generating variable data images using embodiments of the variable data generator.

FIG. 7 is a flowchart for implementing a variable data image using the variable data image generator 100. A 3D scene is created using the modeling unit (700). The 3D scene can include terrain, 3D components, text, and lighting sources, and so on, to provide features and effects within the 3D scene. Surfaces in the 3D scene are designated to be variable by assigning variable identifiers to the surfaces (702). Points in the 3D scene are designated as locations for variable components by assigning variable identifiers to the points (704) and one or more camera positions and orientations are designated in the 3D scene by assigning a unique identifier to the camera positions (706). A component database is created that includes a set of textures and 3D components that can be inserted into the 3D scene (708). Rules are created that can be applied to facilitate selection of textures, 3D components, and camera positions and orientation based on attributes associated with recipients in the recipients database (710).

The rules are applied to each recipient in the recipient database (712) and the 3D scene is populated with textures, 3D components, and text identified based on an application of the rules to attributes of the recipients (714). A screenshot of the scene is captured to generate a static image based on the camera position identified by application of the rules to the attributes of the recipients (716). The resulting static image is stored in storage (718) and can be incorporated into a larger targeted document creation process. The above process can be repeated from 712 to 718 for all recipients in the recipient database.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for generating a variable data image using a computing system having one or more computing devices configured to implement a variable data image generator, the method comprising:
designating a 3D modeling area in a virtual world;
assigning a variable identifier to a specified location in a 3D scene as implemented in the 3D modeling area in the virtual world to identify the specified location in the 3D scene as being variable;
populating the 3D scene in the 3D modeling area in the virtual world with at least one 3D model component at the specified location based on the variable identifier and in response to at least one predefined populating rule implemented using the variable data image generator, the at least one predefined populating rule being applied based on at least two attributes of a recipient for which a static image of the 3D scene in the 3D modeling area in the virtual world is to be generated, the 3D model component being selected and inserted at the specified location in accordance with the at least one populating rule and with a perspective substantially matching a perspective of the specified location, wherein the attributes of the recipient include selectively at least two of the following: gender, age, education level, consumer interests, occupation, income, hobbies, marital status, ethnicity, religious affiliation, and information generated from marketing research;
dynamically inserting a camera position for generating the static image of the 3D scene based on the at least two attributes of the recipient selected from a database as determined by at least one predefined populating rule; and
generating the static image of the 3D scene in the 3D modeling area in the virtual world for the recipient based on the inserted camera position, the static image including the at least one 3D model component.

2. The method of claim 1, wherein assigning the variable identifier to a specified location comprises assigning the variable identifier to a surface in the 3D scene on which the at least one component is to be disposed, the at least one 3D model component including a textural component.

3. The method of claim 1, wherein assigning the variable identifier to a specified location further comprises assigning the variable identifier to a point in the 3D scene for which the at least one 3D model component is to be inserted.

4. The method of claim 1, wherein assigning the variable identifier to the specified location comprises receiving an input from a user associated with at least an x-axis coordinate, a y-axis coordinate, and a z-axis coordinate within the 3D scene.

5. The method of claim 1, further comprising:
associating a first set of 3D model components with the variable identifier, the first set of 3D model components including the at least one 3D model component; and
applying the populating rules to the at least two attributes to identify the at least one 3D model component.

6. The method of claim 1, wherein the 3D scene is rotatable and defined in three dimensions to permit different points of view from which the 3D scene can be captured.

7. The method of claim 6, wherein the static image is defined from a single point of view having a fixed perspective.

8. The method of claim 1 wherein said 3D modeling area is a 3D modeling area in the SECOND LIFE® software product.

9. The method of claim 8 wherein the textural component includes selectively one of the following: a brick wall, grass, and sand.

10. The method of claim 8 wherein the textural component comprises sand.

11. A non-transitory computer readable medium storing instructions executable by a computing system including at least one computing device, wherein execution of the instructions implements a method for generating a variable data image comprising:
designating a 3D modeling area in a virtual world;

assigning a variable identifier to a specified location in a 3D scene as implemented in the 3D modeling area in the virtual world to identify the specified location in the 3D scene as being variable;

populating the 3D scene in the 3D modeling area in the virtual world with at least one 3D model component at the specified location based on the variable identifier and in response to at least one predefined populating rule implemented using the variable data image generator, the at least one predefined populating rule being applied based on at least two attributes of a recipient for which a static image of the 3D scene in the 3D modeling area in the virtual world is to be generated, the 3D model component being selected and inserted at the specified location in accordance with the at least one populating rule and with a perspective substantially matching a perspective of the specified location, wherein the attributes of the recipient include selectively at least two of the following: gender, age, education level, consumer interests, occupation, income, hobbies, marital status, ethnicity, religious affiliation, and information generated from marketing research;

dynamically inserting a camera position for generating the static image of the 3D scene in the 3D modeling area in the virtual world based on the at least two attributes of the recipient selected from a database as determined by at least one predefined populating rule; and generating the static image of the 3D scene in the 3D modeling area in the virtual world for the recipient based on the inserted camera position, the static image including the at least one 3D model component.

12. The medium of claim 11, wherein assigning the variable identifier to a specified location comprises assigning the variable identifier to a surface in the 3D scene on which the at least one 3D model component is to be disposed, the at least one 3D model component including a textural component.

13. The medium of claim 11, wherein assigning the variable identifier to a specified location further comprises assigning the variable identifier to a point in the 3D scene for which the at least one component is to be inserted, the at least one 3D model component including a 3D graphical model.

14. The medium of claim 11, wherein assigning the variable identifier to the specified location comprises receiving an input from a user associated with at least an x-axis coordinate, a y-axis coordinate, and a z-axis coordinate within the 3D scene.

15. The medium of claim 11, wherein execution of the instructions implements a method further comprising:

associating a first set of 3D model components with the variable identifier, the first set of 3D model components including the at least one 3D model component; and applying the populating rules to the at least two attributes to identify the at least one 3D model component.

16. The medium of claim 11, wherein the 3D scene is rotatable and defined in three dimensions to permit different points of view from which the 3D scene can be captured.

17. The medium of claim 16, wherein the static image is defined from a single point of view having a fixed perspective.

18. The medium of claim 11 wherein said 3D modeling area is a 3D modeling area in the SECOND LIFE® software product.

19. A system for generating a variable data image comprising:

a computing system having one or more computing devices, the computing system configured to:

designate a 3D modeling area in a virtual world assign a variable identifier to a specified location in a 3D scene as implemented in the 3D modeling area in the virtual world to identify the specified location in the 3D scene as being variable;

populate the 3D scene in the 3D modeling area in the virtual world with at least one 3D model component at the specified location based on the variable identifier and in response to at least one predefined populating rule implemented using the variable data image generator, the at least one predefined populating rule being applied based on at least two attributes of a recipient for which a static image of the 3D scene in the 3D modeling area in the virtual world is to be generated, the 3D model component being selected and inserted at the specified location in accordance with the at least one populating rule and with a perspective substantially matching a perspective of the specified location, wherein the attributes of the recipient including selectively at least two of the following: gender, age, education level, consumer interests, occupation, income, hobbies, marital status, ethnicity, religious affiliation, and information generated from marketing research;

dynamically insert a camera position for generating the static image of the 3D scene in the 3D modeling area in the virtual world based on at least two attributes of the recipient selected from a database as determined by at least one predefined populating rule; and output the static image of the 3D scene in the 3D modeling area in the virtual world for the recipient based on the inserted camera position, the static image including the at least one 3D model.

20. The system of claim 19, wherein the 3D scene is rotatable and defined in three dimensions to permit different points of view from which the 3D scene can be captured.

21. The system of claim 20, wherein the static image is defined from a single point of view having a fixed perspective.

22. The system of claim 19 wherein said 3D modeling area is a 3D modeling area in the SECOND LIFE® software product.

* * * * *